US007039494B2

(12) United States Patent
Otsuki et al.

(10) Patent No.: US 7,039,494 B2
(45) Date of Patent: May 2, 2006

(54) CONTROLLER FOR MACHINE

(75) Inventors: Toshiaki Otsuki, Hino (JP); Soichiro Ide, Fujiyoshida (JP)

(73) Assignee: Fanuc LTD, Yamanashi (JP)

( * ) Notice: Subject to any disclaimer, the term of this patent is extended or adjusted under 35 U.S.C. 154(b) by 116 days.

(21) Appl. No.: 10/909,304

(22) Filed: Aug. 3, 2004

(65) Prior Publication Data

US 2005/0033459 A1 Feb. 10, 2005

(30) Foreign Application Priority Data

Aug. 5, 2003 (JP) ............................. 2003-286692

(51) Int. Cl.
G06F 19/00 (2006.01)

(52) U.S. Cl. .......................... 700/189; 700/69; 700/71; 700/181; 700/188; 700/193; 700/194; 700/159; 708/290; 708/442; 318/560; 318/567; 318/568.18; 318/568.19; 318/573

(58) Field of Classification Search ................. 700/69, 700/70, 71, 181, 188, 193, 194, 159; 318/560, 318/567, 568.18, 568.19, 573; 708/290, 708/442

See application file for complete search history.

(56) References Cited

U.S. PATENT DOCUMENTS

| 4,791,575 | A | * | 12/1988 | Watts et al. | ................. | 700/194 |
| 5,756,954 | A | * | 5/1998 | Kamiguchi et al. | ...... | 219/69.12 |
| 6,401,006 | B1 | | 6/2002 | Mizuno et al. | | |
| 6,539,275 | B1 | | 3/2003 | Mizuno et al. | | |
| 6,897,626 | B1 | * | 5/2005 | Fujibayashi et al. | .......... | 318/85 |
| 6,920,363 | B1 | * | 7/2005 | Otsuki et al. | .................. | 700/63 |
| 6,920,370 | B1 | * | 7/2005 | Wehrli et al. | ................ | 700/177 |
| 2004/0129688 | A1 | * | 7/2004 | Mori | ..................... | 219/121.61 |

FOREIGN PATENT DOCUMENTS

JP 11-149306 6/1999

(Continued)

OTHER PUBLICATIONS

Notification of Grounds for Rejection (Office Action) in corresponding Japanese Patent Application No. 286692/2003 mailed Oct. 25, 2005.

*Primary Examiner*—Ramesh Patel
(74) *Attorney, Agent, or Firm*—Staas & Halsey LLP (57) ABSTRACT

A controller that eliminates an error caused by acceleration/deceleration control, and controls the velocity of drive axes which is not represented by a rectangular coordinate system such that maximum allowable values of velocity, acceleration, and jerk of the drive axes are not exceeded. A program is analyzed in a command analysis section, and an interpolated position on a motion path in the rectangular coordinate system is determined in a first interpolation section, and then converted by means of a transformation section into drive axes' positions not in the rectangular coordinate system. In a tangential acceleration calculating section, a tangential acceleration is determined. In a velocity limit calculating section, a velocity limit at the time of each position being reached is determined which does not exceed maximum allowable values of velocity, acceleration, and jerk of the drive axes. A deceleration target velocity at the time of each position being reached is determined in a deceleration target velocity calculating section. An intermediate memory stores the calculated results. A motion amount for a processing period of a second interpolation section is determined in an acceleration/deceleration processing section, and is interpolated in the second interpolation section, to be output to a servo control section for the drive axes. By performing the acceleration/deceleration processing before the second interpolation, a trajectory error is eliminated.

4 Claims, 7 Drawing Sheets

FOREIGN PATENT DOCUMENTS

| | | |
|---|---|---|
| JP | 3034843 | 2/2000 |
| JP | 2001-034314 | 2/2001 |
| JP | 2001-092508 | 4/2001 |
| JP | 2001-100828 | 4/2001 |

* cited by examiner

| INTERPOLATED POSITION IN TRANSFORMATION COORDINATE SYSTEM (VECTOR HAVING COMPONENTS FOR DRIVE AXES) | MOTION AMOUNT IN TRANSFORMATION COORDINATE SYSTEM (SCALAR) | VELOCITY IN TRANSFORMATION COORDINATE SYSTEM (VECTOR HAVING COMPONENTS FOR DRIVE AXES) | ACCELERATION IN TRANSFORMATION COORDINATE SYSTEM (VECTOR HAVING COMPONENTS FOR DRIVE AXE) | JERK IN TRANSFORMATION COORDINATE SYSTEM (VECTOR HAVING COMPONENTS FOR DRIVE AXES) | VELOCITY LIMIT (SCALAR) | DECELERATION TARGET VELOCITY (SCALAR) | TANGENTIAL ACCELERATION (SCALAR) |
|---|---|---|---|---|---|---|---|
| $U_0$ (u10, u20, u30, u40, u50, u60) | — | — | — | — | — | — | — |
| $U_1$ (u11, u21, u31, u41, u51, u61) | $L_1$ | $V_1$ (v11, v21, v31, v41, v51, v61) | ($A_1 = A_2$) | ($J_1 = J_3$) | $RF_1$ | $DF_1$ | $AT_1$ |
| $U_2$ (u12, u22, u32, u42, u52, u62) | $L_2$ | $V_2$ (v12, v22, v32, v42, v52, v62) | $A_2$ (a12, a22, a32, a42, a52, a62) | ($J_2 = J_2$) | $RF_2$ | $DF_2$ | $AT_2$ |
| $U_3$ (u13, u23, u33, u43, u53, u63) | $L_3$ | $V_3$ (v13, v23, v33, v43, v53, v63) | $A_3$ (a13, a23, a33, a43, a53, a63) | $J_3$ (j13, j23, j33, j43, j53, j63) | $RF_3$ | $DF_3$ | $AT_3$ |
| $U_a$ (u1a, u2a, u3a, u4a, u5a, u6a) | $L_a$ | $V_a$ (v1a, v2a, v3a, v4a, v5a, v6a) | $A_a$ (a1a, a2a, a3a, a4a, a5a, a6a) | $J_a$ (j1a, j2a, j3a, j4a, j5a, j6a) | $RF_a$ | $DF_a$ | $AT_a$ |
| $U_b$ (u1b, u2b, u3b, u4b, u5b, u6b) | $L_b$ | $V_b$ (v1b, v2b, v3b, v4b, v5b, v6b) | $A_b$ (a1b, a2b, a3b, a4b, a5b, a6b) | $J_b$ (j1b, j2b, j3b, j4b, j5b, j6b) | $RF_b$ | $DF_b$ | $AT_b$ |
| $U_c$ (u1c, u2c, u3c, u4c, u5c, u6c) | $L_c$ | $V_c$ (v1c, v2c, v3c, v4c, v5c, v6c) | $A_c$ (a1c, a2c, a3c, a4c, a5c, a6c) | $J_c$ (j1c, j2c, j3c, j4c, j5c, j6c) | $RF_c$ | $DF_c$ | $AT_c$ |
| $U_d$ (u1d, u2d, u3d, u4d, u5d, u6d) | $L_d$ | $V_d$ (v1d, v2d, v3d, v4d, v5d, v6d) | $A_d$ (a1d, a2d, a3d, a4d, a5d, a6d) | $J_d$ (j1d, j2d, j3d, j4d, j5d, j6d) | $RF_d$ | $DF_d$ | $AT_d$ |

AXES IN RECTANGULAR
COORDINATE SYSTEM FOR
PROGRAM COMMAND

FIG. 9

AXES IN RECTANGULAR
COORDINATE SYSTEM FOR
PROGRAM COMMAND

FIG.10

CONTROLLER FOR MACHINE

BACKGROUND OF THE INVENTION

1. Field of the Invention

The present invention relates to a controller for controlling a machine, and more particularly, to a controller suitable for controlling a machine such as a parallel mechanism machine in which at least one drive axis is driven in a direction other than directions of axes of a rectangular coordinate system.

2. Description of Related Art

In a controller such as a numerical controller for controlling a parallel mechanism machine tool or other machine that has prallelly operating drive axes driven in directions other than direction of axes of a rectangular coordinate system, a command given in the rectangular coordinate system is converted into a command to actuate the drive axes, so as to control the position and orientation of a movable member to which a tool is attached.

Figure 8:
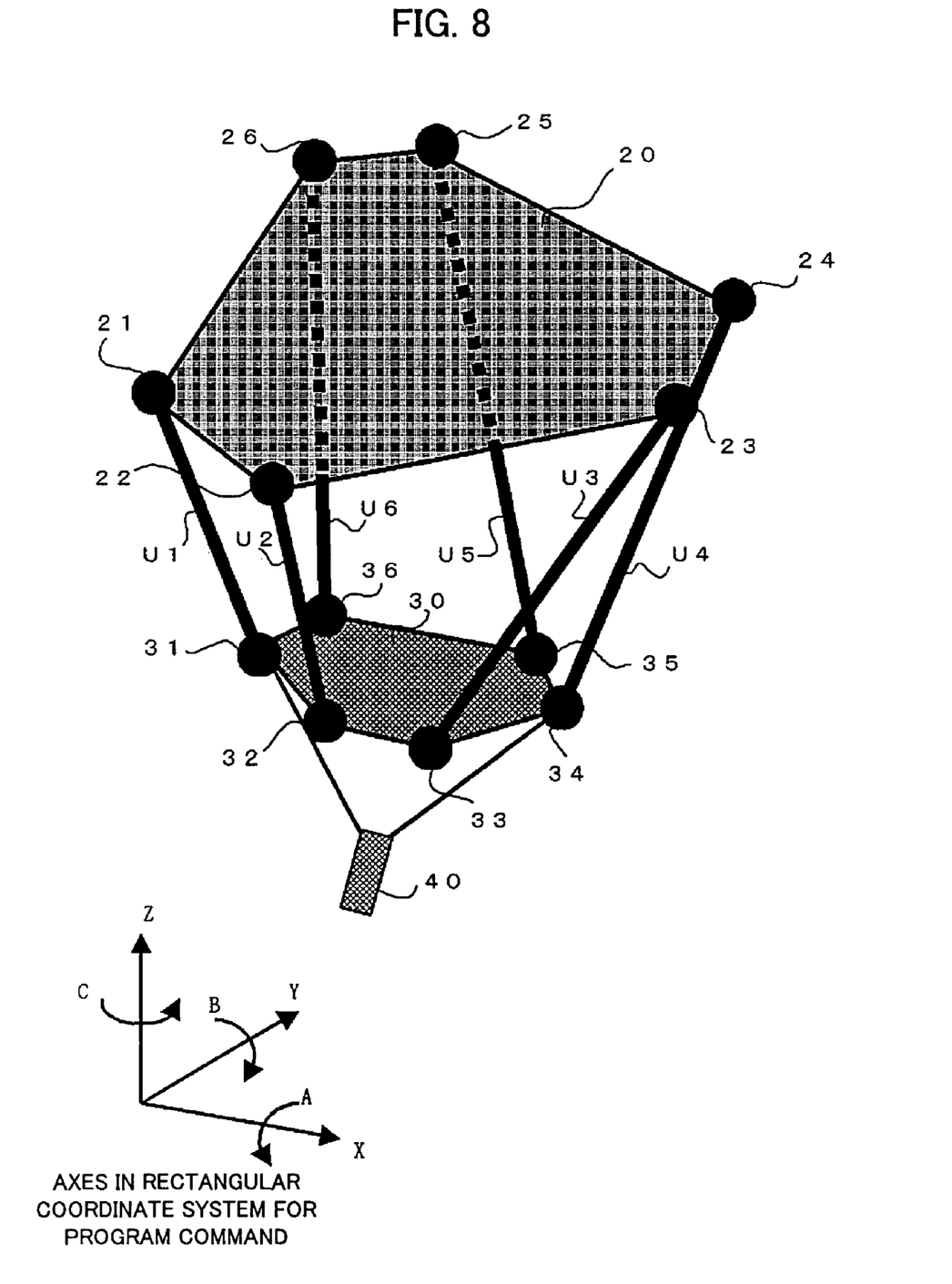
FIG. 8 is a view showing a configuration of a machining apparatus in the embodiment.

By way of example, in the case of a parallel mechanism machine tool shown in FIG. 8, drive axes U1–U6 are immovable in axis directions of an XYZ rectangular coordinate system. This parallel mechanism machine tool includes a stationary member 20 provided with six fulcrums 21–26 individually connected through the drive axes U1–U6 to six fulcrums 31–36 provided in a movable member 30. By means of drive components such as servomotors accommodated in the drive axes U1–U6, distances between corresponding fulcrums are expanded or contracted as desired to control the position and orientation of the movable member 30, whereby the position and orientation of a tool 40 attached to a main axis provided in the movable member 30 are controlled.

Since the coordinates of the fulcrums 21–26 of the stationary member 20 are fixed, if the coordinates of the fulcrums 31–36 corresponding to the desired position and orientation of the movable member 30 (tool 40) have once been determined, it is possible to determine the lengths of the drive axes U1–U6 from the coordinates of the fulcrums 31–36 of the movable member 30. Therefore, by drivingly controlling the drive components such as servomotors in a manner that the drive axes U1–U6 have the determined lengths, the movable member 30 and the tool 40 can be moved to have the desired positions and orientations for machining.

In the case of using a numerical controller or other controller to control the parallel mechanism machine tool, a command in a rectangular coordinate system (command for tool position) is converted into amounts of expansion or contraction of the drive axes U1–U6 with which the positions and orientations of the movable member 30 and the tool 40 are controlled.

For example, there is known a numerical controller (see, JP 2001-34314A) in which, by means of a function generator, interpolated coordinates of X, Y and Z axes of a rectangular coordinate system and interpolated coordinates of rotation axes A, B and C around the X, Y and Z axes are determined from a program command and subject to acceleration/deceleration processing, and by means of an inverse kinematics transformation section, the lengths of the drive axes U1–U6 are determined from those coordinates (X', Y', Z', A', B', C') of the rectangular coordinate system which have been subjected to the acceleration/deceleration processing. Then, the drive components for the drive axes U1–U6 are actuated.

However, the motion velocities of the drive axes U1–U6 (length-changing velocities) determined based on motion commands for the axes U1–U6 obtained by the transformation of a command given in a rectangular coordinate system can sometimes exceed the maximum allowable velocities depending on the motion direction and motion velocity of the movable member 30 (tool 40). To obviate this, another controller is known (see, JP 2001-92508A), in which the velocities of the drive axes in a rectangular coordinate system are determined while limiting them so as not to exceed allowable velocities, and the determined velocities are interpolated in the rectangular coordinate system. Thereafter, motion commands for the drive axes U1–U6 are determined in an inverse kinematics transformation section.

A method is also known which interpolates a program command in two steps, although this method is not relevant to a numerical controller to control a parallel mechanism machine tool. Specifically, a motion path commanded in the program is interpolated at a first sampling period so as to determine first interpolation points which are further interpolated at a second sampling period shorter than the first sampling period, to be used to drivingly control the drive axes. In this case, the motion velocities of the drive axes can suddenly change near the first interpolation points. To obviate this, a further invention is known (see, JP 11-149306A and JP 3034843B) which performs the second interpolation using a smooth curve and performs acceleration/deceleration control after making the first interpolation, thereby smoothing the change in velocity.

When the acceleration/deceleration processing is performed after making the interpolation for the axes based on a command from a program or the like, however, a path error is inevitably caused by a delay in acceleration/deceleration. For example, with the invention disclosed in JP 2001-34314A wherein the inverse kinematics transformation is performed and the drive axes are actuated after making the function generation, that is, after making the acceleration/deceleration for the interpolated commands for respective axes of the rectangular coordinate system, an error is inevitably caused by the acceleration/deceleration because the acceleration/deceleration is implemented after the interpolation.

With the invention disclosed in JP 2001-92508A, the feed velocity in the rectangular coordinate system is controlled in a manner that the allowable velocity of the drive axes of the parallel mechanism machine tool is not exceeded, however, the velocity cannot be controlled so as not to exceed allowable values of acceleration and jerk which is the time derivative of acceleration. Furthermore, cumbersome control must be made, requiring that the numerical controller be equipped with a processor having high capability to execute such control.

SUMMARY OF THE INVENTION

This invention provides a controller capable of eliminating a trajectory error caused by acceleration/deceleration processing and controlling velocities of drive axes so that velocity, acceleration and jerk of the drive axes do not exceed their respective maximum allowable values preset for the drive axes.

A controller of the present invention controls a machine having drive axes driven by servomotors in accordance with an operation program prepared as data in a rectangular coordinate system. The controller comprises: a command analysis section for analyzing commands of the operation program to output data for first interpolation processing; first interpolation means for performing first interpolation processing on the data outputted from the command analysis section to obtain a first interpolated position on a motion path in the rectangular coordinate system at every first sampling period; a transformation section for transforming the first interpolated position in the rectangular coordinate system into positions of the drive axes in a coordinate system of the drive axes; a memory for temporarily storing the transformed positions of the drive axes; a composite tangential acceleration calculating section for obtaining a composite tangential acceleration in the coordinate system of the drive axes for each of segments between the first interpolated positions based on the transformed positions of the drive axes and maximum allowable acceleration values preset for the drive axes; a composite velocity limit calculating section for determining a composite velocity limit in the coordinate system of the drive axes at an end point of each of the segments; a composite deceleration target velocity calculating section for determining a composite deceleration target velocity in the coordinate system of the drive axes at the end point of each of the segments in accordance with the composite tangential acceleration and the composite velocity limit; acceleration/deceleration control means for performing acceleration/deceleration control for a composite tangential velocity of the drive axes in accordance with the composite deceleration target velocity to obtain a composite tangential motion amount at every second sampling period; and second interpolation means for obtaining a second interpolated position at every second sampling period based on the tangential motion amount determined by the acceleration/deceleration control means and the transformed positions of the drive axes stored in the memory to determine motion commands for the drive axes.

The composite velocity limit may be determined as a composite tangential velocity of the drive axes with which at least one of velocity, acceleration and jerk of each of the drive axes does not exceed each associated maximum allowable value preset for each of the drive axes.

The second interpolation means may define a smooth curve on the first interpolated positions, and determines the second interpolated positions on the smooth curve. The smooth curve may be defined according to an n-degree polynomial.

With the above structural features, the controller of the present invention is capable of controlling a machine with a mechanism having one or more drive axes driven in directions other than directions of axes of a rectangular coordinate system in such a manner that velocity, acceleration and jerk of the drive axes do not exceed their maximum allowable values with CPU capability lower than that required in the prior art without causing a trajectory error which may be caused by acceleration/deceleration processing.

BRIEF DESCRIPTION OF THE DRAWINGS

FIG. 4 is a view for explaining data stored in an intermediate memory in the embodiment;

DETAILED DESCRIPTION

Figure 1:
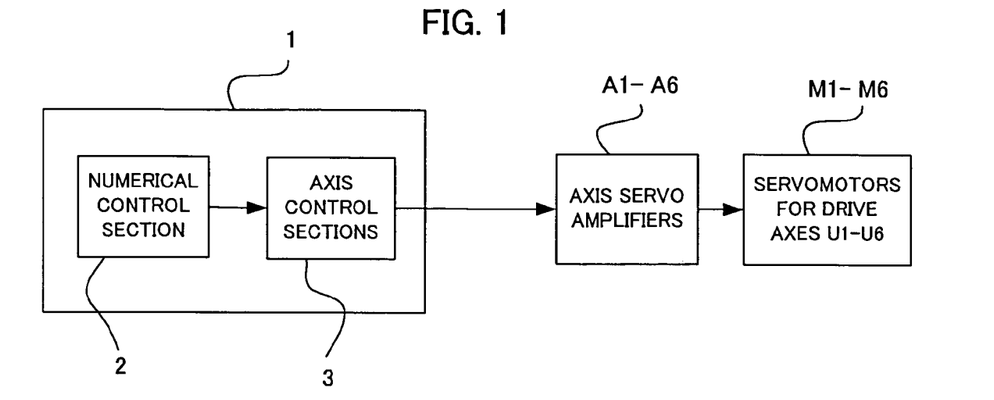
FIG. 1 is a schematic block diagram showing a numerical controller according to one embodiment of this invention.

FIG. 1 shows a numerical controller constituting the controller of the present invention according an embodiment. The numerical controller has a hardware configuration which does not significantly differ from that of a conventional numerical controller, and hence the hardware configuration is schematically shown in FIG. 1. This embodiment will be described on an assumption that the numerical controller controls the parallel mechanism machine tool shown in FIG. 8.

The numerical controller 1 includes a numerical control section 2 for interpolating and distributing motion commands for respective axes based on a motion command commanded by a program or the like, and axis control sections 3 each performing servo control such as feedback control of position, velocity, and current of each of the drive axes in accordance with the motion commands supplied from the numerical control section 2. The axis control sections 3 operate axis servo-amplifiers A1–A6 to drive servomotors M1–M6 for actuating the drive axes U1–U6. In FIG. 1, an illustration of a main axis motor is omitted, which is controlled by the numerical control section through a main axis motor control section.

The numerical controller 1 has the same hardware configuration as that of a conventional 6-axis numerical controller. The following is the description of functional processing that is proper to this invention and performed by software processing in the numerical controller. From the viewpoint of software, this embodiment can be represented by a block arrangement as shown in FIG. 2.

In this embodiment, the command program specifies positions (x, y, z) of basic three axes X, Y, and Z of a rectangular coordinate system as well as positions (a, b, c) of three rotation axes A, B, and C around the X, Y, and Z axes, as in the ordinary machining apparatus. These positions are converted into positions u1, u2, u3, u4, u5, and u6 of the six drive axes U1, U2, U3, U4, U5, and U6 in the numerical controller, with which the servomotors M1–M6 for the drive axes U1–U6 are driven.

Figure 2:
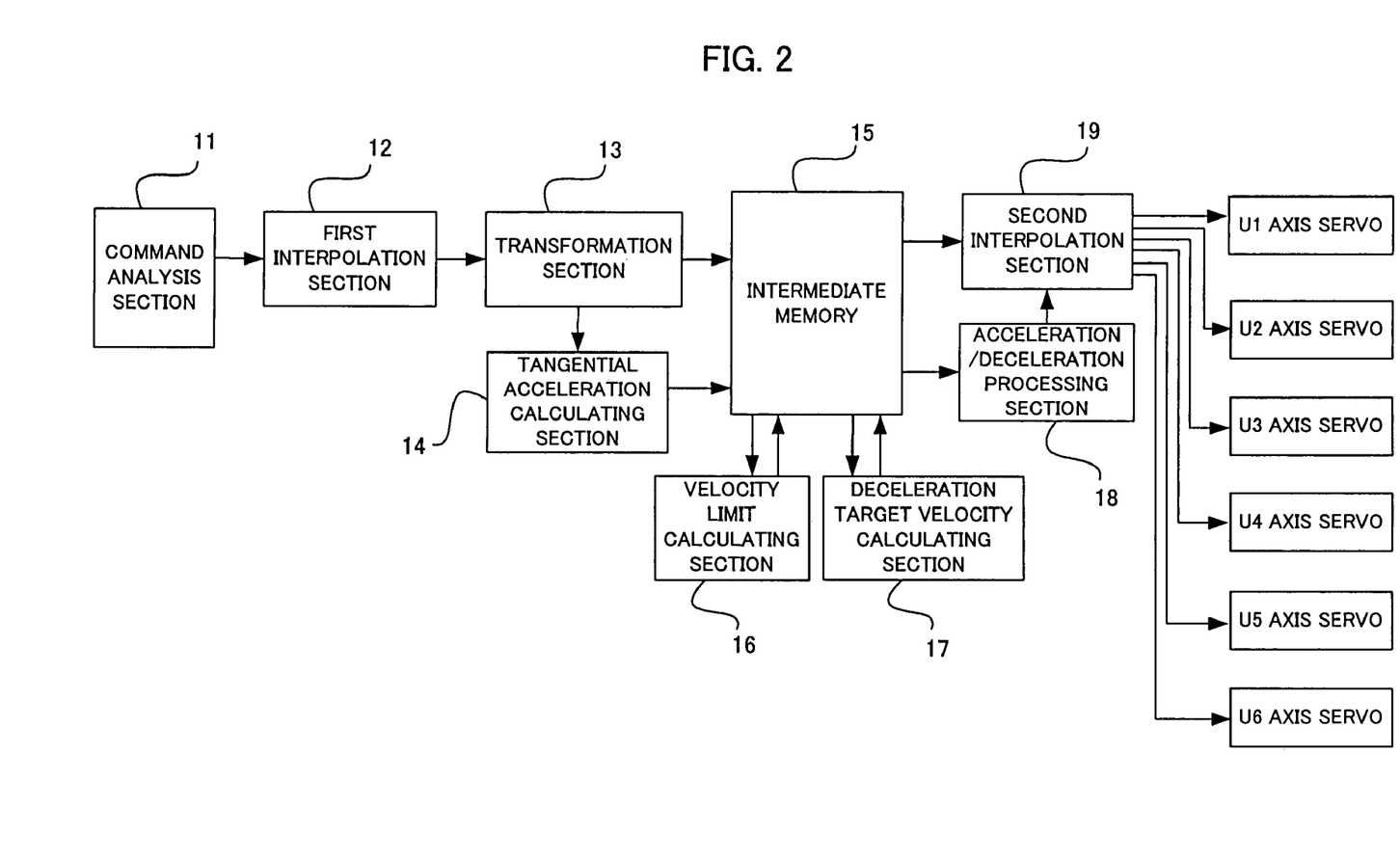
FIG. 2 is a functional block diagram of the embodiment.

In FIG. 2, a command analysis section 11 analyzes the command program in the rectangular coordinate system, and converts the same into data which is easy to be used by a first interpolation section 12. At intervals of a first sampling period, the first interpolation section 12 carries out interpolation calculation of points $P_n(x_n, y_n, z_n, a_n, b_n, c_n)$ of the respective command axes which are on the command path in the rectangular coordinate system. Here, the "n" is a number of interpolation processing in the first interpolation section 12, and indicates the n-th interpolation in the first interpolation section 12. The positions $P_n(x_n, y_n, z_n, a_n, b_n, c_n)$ represent the n-th interpolated position in the first interpolation section 12. A more detailed explanation on the first interpolation is omitted herein, which is the same as that performed in a numerical controller to control an ordinary conventional machining apparatus having three basic axes X, Y, Z and three rotation axes A, B, C.

Figure 3:
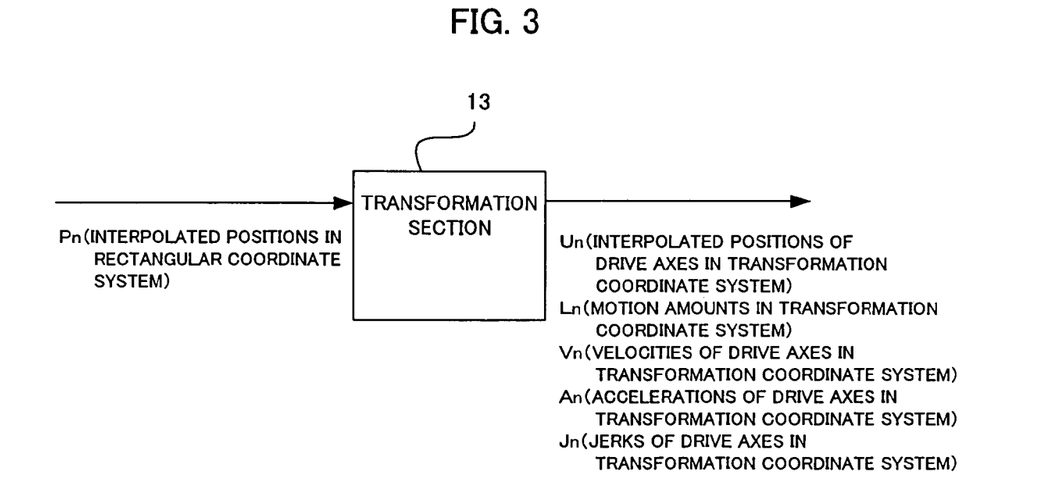
FIG. 3 is a view showing transformation data used in a transformation section in the embodiment.

On the basis of the interpolation point $P_n(x_n, y_n, z_n, a_n, b_n, c_n)$ (n=0, 1, 2, . . . ) determined by the first interpolation section 12, a transformation section 13 carries out an inverse kinematics transformation shown in FIG. 3 to determine a composite position $U_n(u1_n, u2_n, u3_n, u4_n, u5_n, u6_n)$ of the drive axes comprising respective position components for the drive axes in a transformation coordinate system, and outputs the same to an intermediate memory 15. Further, based on the composite positions $U_n(u1_n, u2_n, u3_n, u4_n, u5_n, u6_n)$, the transformation section 13 determines a composite motion amount $L_n$ in the sampling period $\tau 1$ of the first interpolation, a composite velocity $V_n(v1_n, v2_n, v3_n, v4_n, v5_n, v6_n)$, a composite acceleration $A_n(a1_n, a2_n, a3_n, a4_n, a5_n, a6_n)$, and a composite jerk $J_n(j1_n, j2_n, j3_n, j4_n, j5_n, j6_n)$ as the time derivative of acceleration of the drive axes, and outputs them to the intermediate memory 15. The method of inverse kinematics transformation is known, and hence an explanation thereof is omitted. Hereinafter, the term "segment" represents a partial composite motion of the drive axes from a certain position to the next position in the transformation coordinate system, which motion is determined by subjecting the interpolated position, determined by the first interpolation section 12, to the inverse kinematics transformation of the transformation section 13. Specifically, the partial motion from each position $U_{n-1}$ to each position $U_n$ is called as the n-th segment.

The composite motion amount $L_n$ is a motion amount in the transformation coordinate system for every first sampling period that is determined by performing a processing calculation shown in the following equation (1):

$$L_n = \{(u1_n - u1_{n-1})^2 + (u2_n - u2_{n-1})^2 + (u3_n - u3_{n-1})^2 + (u4_n - u4_{n-1})^2 + (u5_n - u5_{n-1})^2 + (u6_n - u6_{n-1})^2\}^{1/2} \quad (1)$$

Based on the interpolated positions $U_n(u1_n, u2_n, u3_n, u4_n, u5_n, u6_n)$ and the sampling period $\tau 1$ of the first interpolation, the composite velocity $V_n(v1_n, v2_n, v3_n, v4_n, v5_n, v6_n)$ of the drive axes in the transformation coordinate system is determined by performing calculation processing shown in the following equations (2-1) to (2-6):

$$v1_n = (u1_n - u1_{n-1})/\tau 1 \quad (2\text{-}1)$$
$$v2_n = (u2_n - u2_{n-1})/\tau 1 \quad (2\text{-}2)$$
$$v3_n = (u3_n - u3_{n-1})/\tau 1 \quad (2\text{-}3)$$
$$v4_n = (u4_n - u4_{n-1})/\tau 1 \quad (2\text{-}4)$$
$$v5_n = (u5_n - u5_{n-1})/\tau 1 \quad (2\text{-}5)$$
$$v6_n = (u6_n - u6_{n-1})/\tau 1 \quad (2\text{-}6)$$

From the composite velocity $V_n(v1_n, v2_n, v3_n, v4_n, v5_n, v6_n)$ of the drive axes determined by equations (2-1) to (2-6) and the first sampling period $\tau 1$, the composite acceleration $A_n(a1_n, a2_n, a3_n, a4_n, a5_n, a6_n)$ of the drive axes in the transformation coordinate system is determined by performing calculation processing shown in the following equations (3-1) to (3-6):

$$a1_n = (v1_n - v1_{n-1})/\tau 1 \quad (3\text{-}1)$$
$$a2_n = (v2_n - v2_{n-1})/\tau 1 \quad (3\text{-}2)$$
$$a3_n = (v3_n - v3_{n-1})/\tau 1 \quad (3\text{-}3)$$
$$a4_n = (v4_n - v4_{n-1})/\tau 1 \quad (3\text{-}4)$$
$$a5_n = (v5_n - v5_{n-1})/\tau 1 \quad (3\text{-}5)$$
$$a6_n = (v6_n - v6_{n-1})/\tau 1 \quad (3\text{-}6)$$

From the composite acceleration $A_n(a1_n, a2_n, a3_n, a4_n, a5_n, a6_n)$ of the drive axes determined by equations (3-1) to (3-6) and the first sampling period $\tau 1$, the composite jerk $J_n(j1_n, j2_n, j3_n, j4_n, j5_n, j6_n)$ as time derivative of acceleration, of the drive axes in the transformation coordinate system is determined by performing calculation processing shown in the following equations (4-1) to (4-6):

$$j1_n = (a1_n - a1_{n-1})/\tau 1 \quad (4\text{-}1)$$
$$j2_n = (a2_n - a2_{n-1})/\tau 1 \quad (4\text{-}2)$$
$$j3_n = (a3_n - a3_{n-1})/\tau 1 \quad (4\text{-}3)$$
$$j4_n = (a4_n - a4_{n-1})/\tau 1 \quad (4\text{-}4)$$
$$j5_n = (a5_n - a5_{n-1})/\tau 1 \quad (4\text{-}5)$$
$$j6_n = (a6_n - a6_{n-1})/\tau 1 \quad (4\text{-}6)$$

FIG. 4 is a view for explaining data stored in the intermediate memory 15. As shown in FIG. 4, the interpolated positions $U_n(u1_n, u2_n, u3_n, u4_n, u5_n, u6_n)$ in the transformation coordinate system (the positions of the drive axes U1–U6), the motion amount $L_n$ in the transformation coordinate system, the composite velocity $V_n(v1_n, v2_n, v3_n, v4_n, v5_n, v6_n)$ of the drive axes in the transformation coordinate system, the composite acceleration $A_n(a1_n, a^2n, a3_n, a4_n, a5_n, a6_n)$ of the drive axes in the transformation coordinate system, and the composite jerk $J_n(j1_n, j2_n, j3_n, j4_n, j5_n, j6_n)$ of the drive axes in the transformation coordinate system as well as the later-mentioned velocity limit $RF_n$, deceleration target velocity $DF_n$, and tangential acceleration $AT_n$ are stored so as to correspond to the sequence number n of the first interpolation period. From the nature of equations (1), (2-1) to (2-6), (3-1) to (3-6), and (4-1) to (4-6), the motion amount $L_0$, velocity $V_0$, acceleration $A_0$, and jerk $J_0$ that correspond to the interpolation start position $U_0$ are not present. For a similar reason, neither the acceleration $A_1$ and jerk $J_1$ in the transformation coordinate system corresponding to the interpolation point $U_1$ nor the jerk $J_2$ in the transformation coordinate system corresponding to the interpolation point $U_2$ are present. For the required calculations, relations of $A_1 = A_2$, $J_1 = J_3$, and $J_2 = J_3$ are set in advance.

Figure 5:
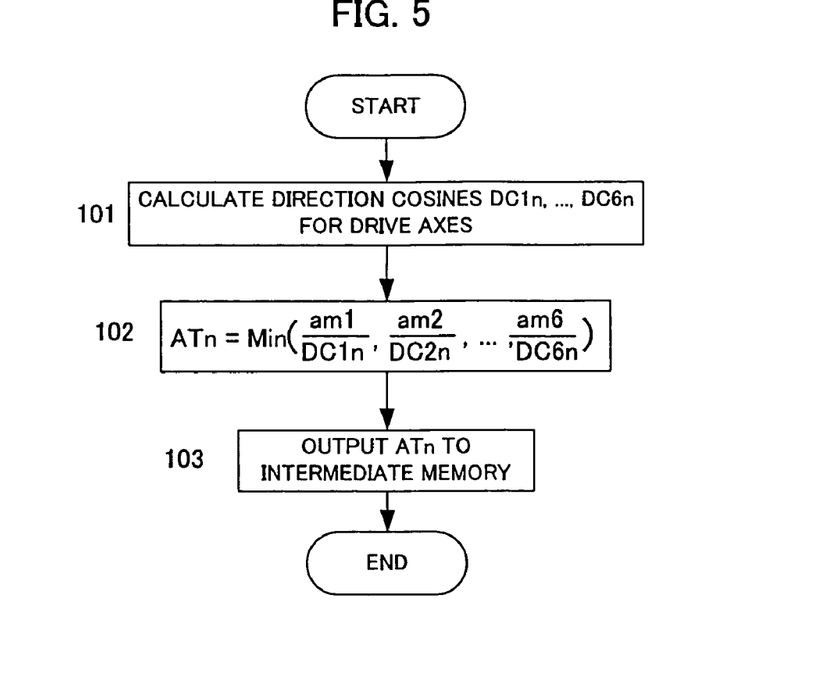
FIG. 5 is a flowchart of processing for calculating tangential acceleration in the embodiment.

FIG. 5 is a flowchart showing procedures that are executed by a tangential acceleration calculating section 14 to determine an optimum tangential acceleration from position data $U_n$ (n=0, 1, . . . ) of the drive axes that is output from the transformation section 13 and maximum allowable accelerations am1, am2, am3, am4, am5, and am6 of the drive axes. Referring to the flowchart, the procedures to determine the optimum tangential acceleration $AT_n$ will be explained.

At Step 101 in FIG. 5, a motion amount (for one segment) of the drive axes is determined from the position data $U_n$ (n=0, 1, . . . ) of the drive axes, and determines a direction cosine DCi for the drive axes.

Suffix i denotes an axis number. Since U1, U2, U3, U4, U5, and U6 axes are to be controlled, there is a relation of i=1, 2, 3, 4, 5, and 6. In this case, the direction cosine DC1 is the cosine of an angle formed between the first axis (U1 axis) and a motion direction vector, which is obtained by combining the respective one segments of the respective axes (vector synthesis), i.e., a composite tangential vector. Thus, the n-th data (n=1, 2, . . . ) for DC1 is represented by:

$$DC1_n = |u1_n - u1_{n-1}|/L_n \quad (5),$$

where $L_n$ is a composite motion amount in the transformation coordinate system in every first sampling period, which is already output to the intermediate memory.

Similarly, each of the direction cosines DC2, DC3, DC4, DC5, and DC6 is the cosine of an angle formed between the U2, U3, U4, U5 or U6 axis and a motion direction vector (composite tangential vector), which is obtained by combining the respective one segments of the respective axes.

In respect of all the axes commanded, an acceleration in the motion direction represented by the motion direction vector (that is, a composite. tangential acceleration) AW must satisfy the following requirement:

$$AW \times DCi \leq ami \quad (6),$$

wherein ami is the maximum allowable acceleration of the i-th drive axis. Specifically, the following requirements must be satisfied:

$$AW \times DC1_n \leq am1 \quad (7\text{-}1),$$

$$AW \times DC2_n \leq am2 \quad (7\text{-}2),$$

$$AW \times DC3_n \leq am3 \quad (7\text{-}3),$$

$$AW \times DC4_n \leq am4 \quad (7\text{-}4),$$

$$AW \times DC5_n \leq am5 \quad (7\text{-}5),$$

$$AW \times DC6_n \leq am6 \quad (7\text{-}6),$$

At Step 102, an optimum tangential acceleration $AT_n$ is determined using the results of Step 101. The optimum tangential acceleration $AT_n$ is calculated to have a maximum value and at the same time satisfy the aforementioned requirement which indicates that the tangential acceleration must be less than or equal to the maximum allowable acceleration in respect of all the drive axes to be actuated. In other words, it is necessary to find the minimum of ami/DCi (i=1,2, . . . ,6), that is, Min{ami/DCi} (i=1,2, . . . ,6). Accordingly, $AT_n$ must satisfy the following requirement:

$$AT_n = \text{Min}\{ami/DCi_n\} \; (i=1,2,\ldots,6), (n=1,2,\ldots,6) \quad (8)$$

At the next Step 103, the determined optimum tangential acceleration $AT_n$ is output to the intermediate memory 15, whereupon the processing is completed.

In this manner, the positions $U_n$ of the drive axes, which is output from the transformation section 13, the optimum tangential acceleration $AT_n$, and the like are stored in the intermediated memory 15 in every first sampling period. To be noted, the optimum tangential acceleration $AT_n$ is not the constant in general, but varies depending on the positions $U_n$ which is output from the transformation section 13.

Based on the data in the intermediate memory 15, a velocity limit calculating section 16 calculates a velocity limit $RF_n$ corresponding to each point $U_n$ (n=1,2, . . . ) in the transformation coordinate system, and writes the same into the intermediate memory 15.

The velocity limit $RF_n$ relates to the composite tangential velocity for each segment, and is limited to a velocity that does not exceed maximum allowable values of velocity, acceleration, and jerk of each drive axis. Specifically, the velocity, acceleration, and jerk of the drive axes have maximum allowable values that are set as VM(vm1, vm2, vm3, vm4, vm5, vm6), AM(am1, am2, am3, am4, am5, am6), and JM(jm1, jm2, jm3, jm4, jm5, jm6), respectively. The velocity limit $RF_n$ is a composite tangential velocity in each segment at which the velocity, acceleration, and jerk of each drive axis do not exceed the maximum allowable values for every first sampling period.

The composite tangential velocity in each segment that is based on data output from the transformation section 13 is $L_n/\tau 1$. The calculation of the velocity limit $RF_n$ is to perform the following processing for the velocity $L_n$ to thereby determine such a composite velocity limit $RF_n$ (n=1,2, . . . ) in each segment as to permit the each drive axis to have a velocity, acceleration, and jerk not exceeding the maximum allowable values. The calculated velocity limit $RF_n$ (n=1,2,) is output to the intermediate memory 15.

$$KV = \text{Min}(vm1/v1_n, vm2/v2_n, vm3/v3_n, vm4/v4_n, vm5/v5_n, vm6/v6_n) \quad (9)$$

Formula (9) indicates that KV is determined as the minimum of values in the parenthesis on the right-hand side. When the minimum of these values is equal to or larger than 1, KV is determined to be equal to 1.

$$KA = \text{Min}(am1/a1_n, am2/a2_n, am3/a3_n, am4/a4_n, am5/a5_n, am6/a6_n) \quad (10)$$

Formula (10) indicates that KA is determined as the minimum of values in the parenthesis on the right-hand side. When the minimum of the values is equal to or larger than 1, KA is determined to be equal to 1.

$$KJ = \text{Min}(jm1/j1_n, jm2/j2_n, jm3/j3_n, jm4/j4_n, jm5/j5_n, jm6/j6_n) \quad (11)$$

Formula (11) indicates that KJ is determined as the minimum of values in the parenthesis on the right-hand side. When the minimum of the values is equal to or larger than 1, KJ is determined to be equal to 1.

$$RF_n = \text{Min}(KV, KA, KJ) \times L_n/\tau 1 \quad (12)$$

In equation (12), Min(KV,KA,KJ) is determined as the minimum of KV, KA, and KJ.

Formulae (9)–(11) and Min(KV,KA,KJ) in equation (12) indicate that the minimum of ratios of the maximum allowable velocities to the velocities, ratios of the maximum allowable accelerations to the accelerations, and ratios of the maximum allowable jerks to the jerks is to be selected. Thus, among the velocities, accelerations, and jerks that are determined by the transformation section 13 in accordance with equations (2-1) to (2-6), (3-1) to (3-6), and (4-1) to (4-6), that one is selected which is the largest relative to the maximum allowable values of velocity, acceleration, and jerk in respect of the drive axes U1–U6.

For example, if "vm1/v1$_n$" the minimum, this indicates that it is the velocity of the drive axis U1 that has the largest relative excess over the maximum allowable value. In equation (12), Min(KV,KA,KJ) is equal to "vm1/v1$_n$." As a result, the velocity limit $RF_n$ is represented by a relation of $RF_n = (vm1/v1_n) \times L_n/\tau 1$.

At the velocity of "$L_n/\tau 1$," the velocity of the drive axis U1 equals to V1$_n$. From a proportional relation between the velocity and the velocity limit $RF_n$, the following equation stands:

$$(L_n/\tau 1)/V1_n = RF_n/(\text{velocity of drive axis } U1).$$

$$(\text{velocity of drive axis } U1) = RF_n \times V1_n/(L_n/\tau 1)$$

$$= [(vm1/V1_n) \times L_n/\tau 1] \times V1_n/(L_n/\tau 1) = vm1$$

By limiting to the velocity limit $RF_n$, the velocity of the drive axis U1 which has the largest relative excess over the maximum allowable value is limited to the allowable velocity. Since the velocity limit $RF_n$ is determined based on the minimum that is selected in accordance with Min(KV,KA, KJ), the velocities, accelerations, and jerks of the other drive axes also fall within the maximum allowable values, respectively.

As mentioned above, by the calculating processing in accordance with equations (9)–(12), the velocity limit $RF_n$ is determined, which is then stored in the intermediate memory 15 as shown in FIG. 4.

In this embodiment, the velocity limit $RF_n$ is determined in such a manner that all the velocity, acceleration, and jerk (of each of the drive axes U1–U6) in the transformation coordinate system do not exceed the maximum allowable values. However, the velocity limit may be so determined as to prevent one or two of the velocity, acceleration, and jerk from exceeding the maximum allowable value or values. In the case of limiting only the velocity to below the allowable value, KV is used instead of Min(KV,KA,KJ) in equation (12). If only the acceleration is to be limited, KA is used therein. If both the velocity and acceleration are to be limited to below the allowable values, Min(KV,KA) is used instead of Min(KV,KA,KJ) in equation (12).

The data delivered to the intermediate memory 15 is used for the processing to calculate a deceleration target velocity in a deceleration target velocity calculating section 17. The calculation of deceleration target velocity is to perform "acceleration/deceleration across plural segments" which will be explained based on an example shown in FIG. 6.

Figure 6:
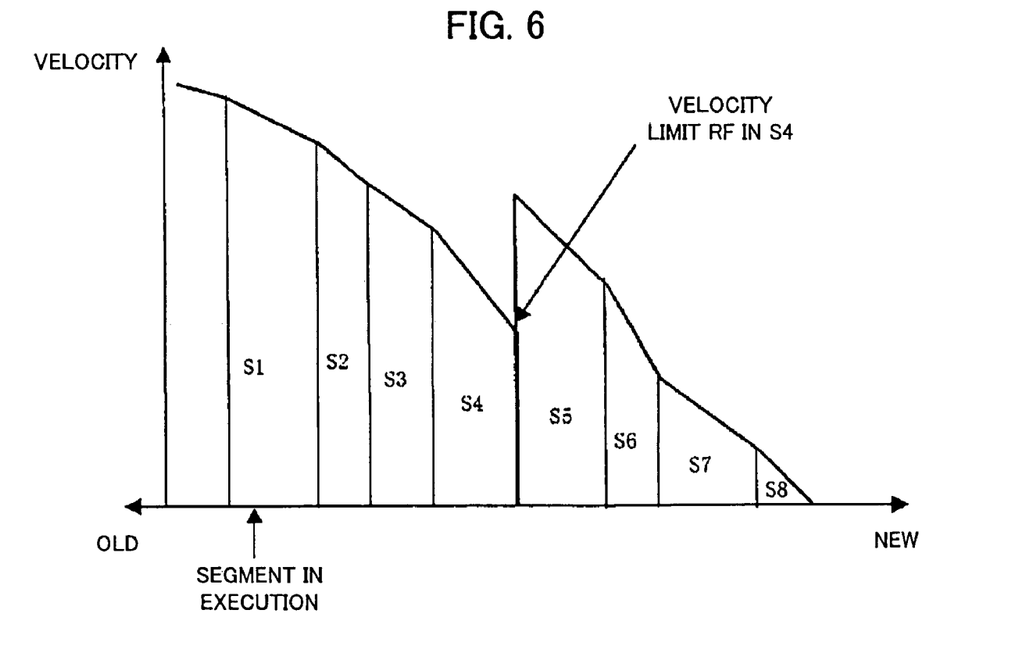
FIG. 6 is a view for explaining calculation of deceleration target velocity in the embodiment.

In FIG. 6, S1, S2, . . . , S8 denote segments in the intermediate memory that are output from the transformation section 13. Among S1-S8, the segment S8 is the latest segment in the intermediate memory 15, and the segment S1 is the segment which is currently executed. In the following, the term "segment in execution" indicates the latest segment for which the second interpolation processing has been already started by the second interpolation section 19, and at the same time indicates the oldest segment in the intermediate memory 15. (The segment data for which the processing by the second interpolation is completed is erased from the intermediate memory 15, and the second interpolation processing of the next segment is started immediately.)

On an assumption for example that the velocity at the end point of the latest segment S8 stored in the intermediate memory 15 is zero and that the velocity at the end point of each segment (zero for the segment S8) is reached as a result of deceleration with the optimum tangential acceleration $AT_n$ determined for each segment, the velocity at the start point of each segment (initially, at the start point of the segment S8) is determined. The determined velocity is used as the velocity at the end point of the one-old segment (segment S7 for segment S8). Subsequently, the velocity at the start point of the one-old segment is repeatedly determined until the segment S1 in execution (the oldest segment in the intermediate memory) is reached, whereby a speed pattern is created.

As in the case of the end point of the segment S4 in FIG. 6, if on the way the velocity limit $RF_n$ or the composite tangential velocity $L_n/\tau 1$ that is based on data output from the transformation section 13 becomes lower than the velocity of the created velocity pattern, a velocity pattern starting from that velocity is newly created. The reason why the velocity at the end point of the latest segment in the intermediate memory 15 is temporarily set to zero is that deceleration to zero can be achieved without fail, even if the first interpolation or operations on the side of the transformation section is stopped. The velocities at the end points of the segments in the created velocity pattern are input to and stored in the intermediate memory as the deceleration target velocities $DF_n$ (n=1,2, . . . ) of the respective segments.

On the basis of data in the intermediate memory 15, an acceleration/deceleration processing section 18 performs acceleration/deceleration control to obtain a maximum velocity not exceeding the deceleration target velocity, and determines a motion amount $\Delta S$ in every second sampling period $\tau 2$ which is then output to a second interpolation section 19. It is assumed here that the second interpolation is performed mz times in the first sampling period $\tau 1$. That is, mz=$\tau 1/\tau 2$. The composite tangential velocity is $L_n/\tau 1$ that is output from the transformation section in the n-th first interpolation period. Each velocity obtained from the deceleration target velocity $DF_n$ in the m-th (m=1, . . . ,mz) second interpolation period in the first interpolation period is represented by:

$$DF_{n-1}+(DF_n-DF_{n-1})\times m/mz \qquad (13)$$

Among the velocities, a much lower velocity is a velocity that is to be realized in the second sampling period. From this velocity to be realized in the second sampling period, a motion amount $\Delta S$ in this second sampling period is determined, which is represented as follows:

$$\Delta S=\text{Min}((Ln/\tau 1),(DF_{n-1}+(DF_n-DF_{n-1})\times m/mz))\times \tau 2 \qquad (14)$$

At intervals of the second sampling period $\tau 2$, the second interpolation section 19 performs interpolation based on the output from the acceleration/deceleration processing section 18 and data fetched from the intermediate memory 15. As for interpolation shape, there may be an interpolation in which a series of points $U_n$ (n=0,1, . . . ) are connected with a straight line, and an interpolation in which a smooth curve is generated from the points $U_n$ (n=0,1, . . . ) and a point on the smooth curve is output in every second sampling period. The second sampling period $\tau 2$ is shorter than the first sampling period $\tau 1$. For example, the first and second sampling periods $\tau 1$, $\tau 2$ are 4 ms and 0.5 ms, respectively.

In this embodiment, a smooth curve is generated from the series of points $U_n$ (n=0,1, . . . ), and a smooth interpolation is performed in the second interpolation section 19. There are various methods to generate a smooth curve. In this embodiment, a method using an n-degree (three degree) expression passing through the points $U_n$ (n=0,1, . . . ) is adopted for simplicity. Here, a curve interpolation portion between a certain point and the next point in the series of the points $U_n$ (n=0,1, . . . ) is referred to as a segment. Symbols used in the below-mentioned flowchart are defined as follows:

Ua: One-old point immediately preceding the start point of the segment currently under interpolation processing among the points $U_n$ (n=0,1, . . . );

Ub: Start point of the segment currently under interpolation processing among the points $U_n$ (n=0,1, . . . );

Uc: End point of the segment currently under interpolation processing among the points $U_n$ (n=0,1, . . . );

Ud: Point immediately subsequent to the end point of the segment currently under interpolation processing among the points $U_n$ (n=0,1, . . . );

Lb: Distance between Ua and Ub;

Lc: Distance between Ub and Uc;

Ld: Distance between Uc and Ud;

$\Delta s$: Motion amount in a composite tangential direction of the drive axes in every second sampling period that is output to the second interpolation section after subjected to acceleration/deceleration control of attaining a maximum velocity not exceeding a target deceleration velocity in the acceleration/deceleration processing section; and KI: Coefficient indicative of a ratio of pending output of a motion amount, which is observed at the time of segment changeover.

The coordinate of an interpolation point in a segment is calculated according to the following equations (15-1) to (15-6), in which a parameter t is assumed to have values of −Lb, 0, Lc, and (Lc+Ld) at points Ua, Ub, Uc, and Ud, respectively. Coefficients A1, B1, C1, D1, A2, B2, C2, D2, A3, B3, C3, D3, A4, B4, C4, D4, A5, B5, C5, D5, A6, B6, C6, and D6 are determined from a requirement that coordinate values of U(t)(U1(t),U2(t),U3(t),U4(t),U5(t),U6(t)) at the just-mentioned time points be in coincidence with coordinate values of the points Ua–Ud, respectively. The second interpolation section 19 causes the parameter t to vary in a range of 023 t≦Lc in the following equations (15-1) to (15-6), to thereby determine interpolation points in a segment.

$$U1(t)=A1 \times t^3 + B1 \times t^2 + C1 \times t + D1 \quad (15\text{-}1)$$

$$U2(t)=A2 \times t^3 + B2 \times t^2 + C2 \times t + D2 \quad (15\text{-}2)$$

$$U3(t)=A3 \times t^3 + B3 \times t^2 + C3 \times t + D3 \quad (15\text{-}3)$$

$$U4(t)=A4 \times t^3 + B4 \times t^2 + C4 \times t + D4 \quad (15\text{-}4)$$

$$U5(t)=A5 \times t^3 + B5 \times t^2 + C5 \times t + D5 \quad (15\text{-}5)$$

$$U6(t)=A6 \times t^3 + B6 \times t^2 + C6 \times t + D6 \quad (15\text{-}6)$$

The derivatives of U1(t), U2(t), U3(t), U4(t), U5(t) and U6(t) with respect to parameter t are denoted by U1'(t), U2'(t), U3'(t), U4'(t), U5'(t) and U6'(t), respectively.

Figure 7:
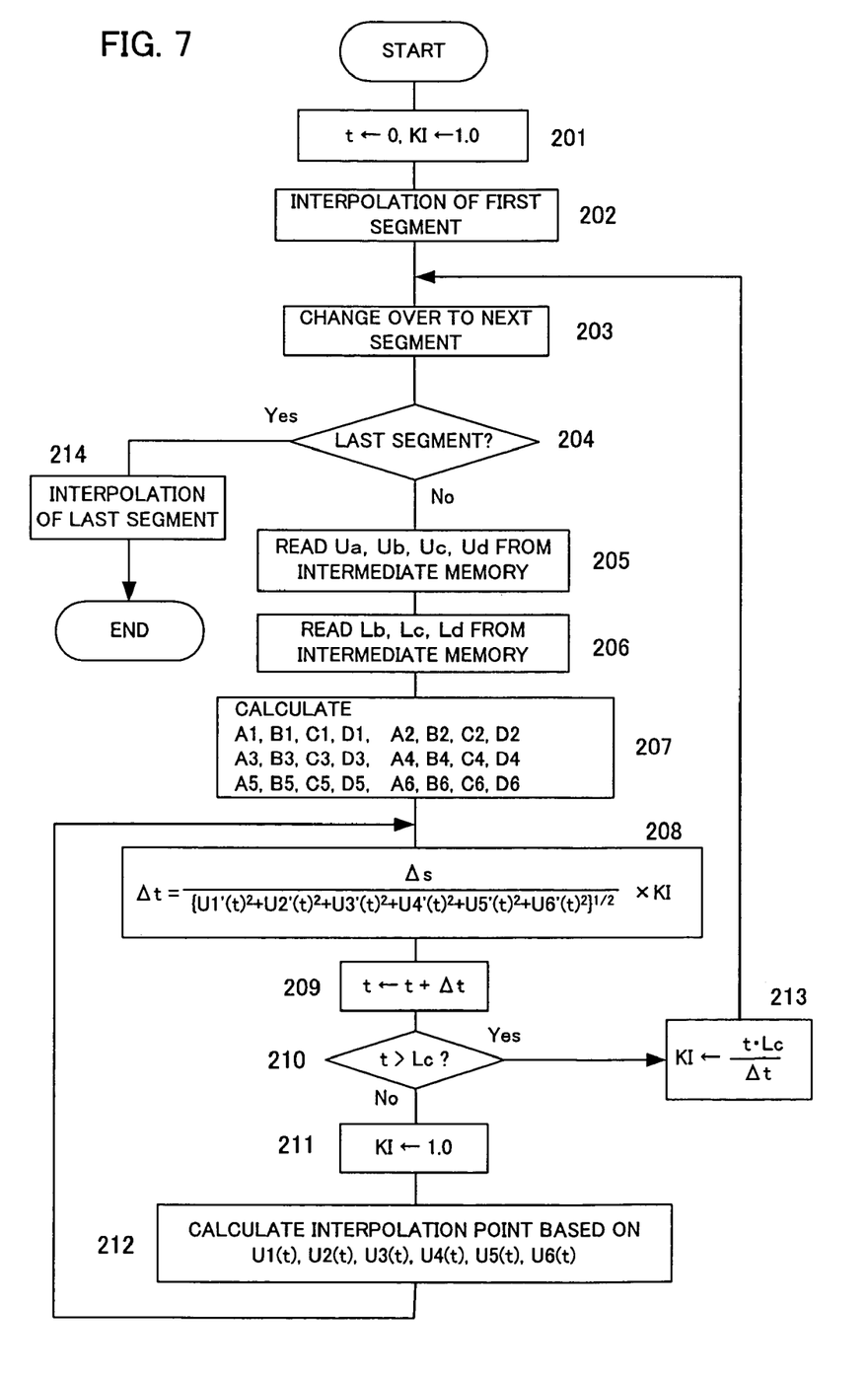
FIG. 7 is a flowchart of second interpolation processing in the embodiment.

FIG. 7 is a flowchart showing the interpolation processing performed by a processor of the numerical controller, serving as the second interpolation section 19. In the flowchart, main points of the processing in each step are as follows:

Step 201: The parameter t and the coefficient KI are initialized. The coefficient KI is a coefficient indicative of a ratio of a motion amount that is not output until segment changeover, and KI is set at 1.0 except at the time of segment changeover.

Step 202: Interpolation of the first segment is performed. In the first segment where the point Ua immediately preceding this segment is not present, the interpolation processing is carried out in a way different from the way which will be described for Step 203, et seq. The interpolation processing method in that case is well known, and a detailed explanation thereof is omitted.

Step 203: The segment for which the interpolation processing must be performed is changed to the next segment.

Step 204: A determination is made whether or not the segment currently under the interpolation processing is the latest segment. If the current segment is the latest one, the flow proceeds to Step 214 (interpolation processing for the latest segment). If not so, the flow proceeds to Step 205.

Steps 205–207: Coordinates of Ua, Ub, Uc, and Ud and segment distances Lb, Lc, and Ld are read from the intermediate memory. Then, the coefficients A1, B1, C1 D1, A2, B2, C2, D2, A3, B3, C3, D3, A4, B4, C4, D4, A5, B5, C5, D5, A6, B6, C6, and D6 of U1(t), U2(t), U3(t), U4(t), U5(t), and U6(t) in equations (15-1) to (15-6) for the interpolation are determined.

Step 208: An increment t in parameter t is determined from s for the second sampling period τ2 calculated by the acceleration/deceleration processing section 18, the first order derivatives of U1(t), U2(t), U3(t), U4(t), U5(t), and U6(t), and the coefficient KI.

Step 209: The increment t is added to the parameter t.

Step 210: The parameter t is compared with the distance Lc. If a relation of t>Lc stands, then it is determined that changeover to the next segment must be made. In this case, the flow proceeds to Step 213 (calculation of the ratio KI of distance to be output in the next segment). If a relation of t≦Lc stands, it is determined that the processing must still be made for the current segment, and the flow proceeds to Step 211.

Step 211: The ratio KI is set to be equal to 1.0.

Step 212: A second interpolation point is calculated based on U1(t), U2(t), U3(t), U4(t), U5(t), and U6(t), and the calculated point is output. Whereupon the flow returns to Step 208.

Step 213: The coefficient (ratio) KI indicative of a distance to be output in the next segment is calculated.

Step 214: The interpolation processing is performed for the latest segment. In the latest segment where the point Ud immediately subsequent to this segment is not present, the interpolation processing is carried out in a way different from the way described for Step 203, et seq. The interpolation processing method in that case is well known, and a detailed explanation thereof is omitted here.

As described above, the acceleration/deceleration processing is performed before the second interpolation. This makes it possible to eliminate an error relative to a command.

This embodiment is applicable not only to a parallel mechanism machine but also to other machine having at least one drive axis whose direction differs from an axis direction of a rectangular coordinate system. The number of command axes among the motion axes may be arbitrary, and the number of drive axes in the transformation coordinate system may also be arbitrary. Each command axis in the rectangular coordinate system may be a linear or rotation axis.

Figure 9:
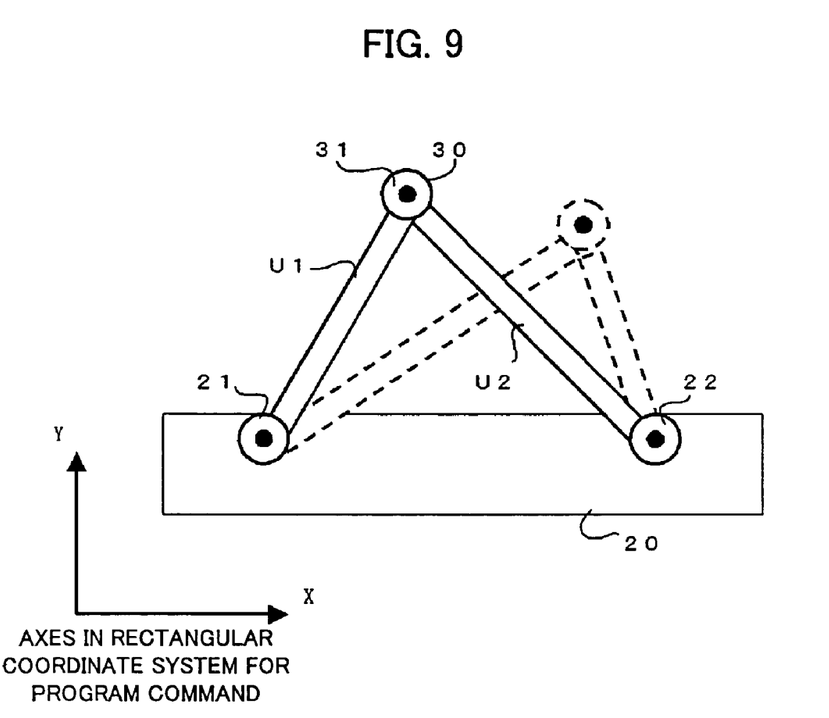
FIG. 9 is a view showing an example of a motion mechanism to which this invention is applicable.

For example, in an example shown in FIG. 9, two expandable and contractible dive axes U1, U2 have one ends thereof connected to a stationary member 20 at fulcrums 21, 22, and the other ends thereof connected to a movable member 30 at a fulcrum 31. The drive axes U1, U2 accommodate therein servomotors by means of which the lengths of the drive axes U1, U2 are expanded or contracted. In this mechanism, motion commands are provided for two axes (X, Y), which are command axes in a rectangular coordinate system. These motion commands are converted into motion commands for the drive axes U1, U2, with which the servomotors of the drive axes are actuated, whereby the position and velocity of the movable member 30 are controlled. This invention is applicable to the just-mentioned mechanism.

Figure 10:
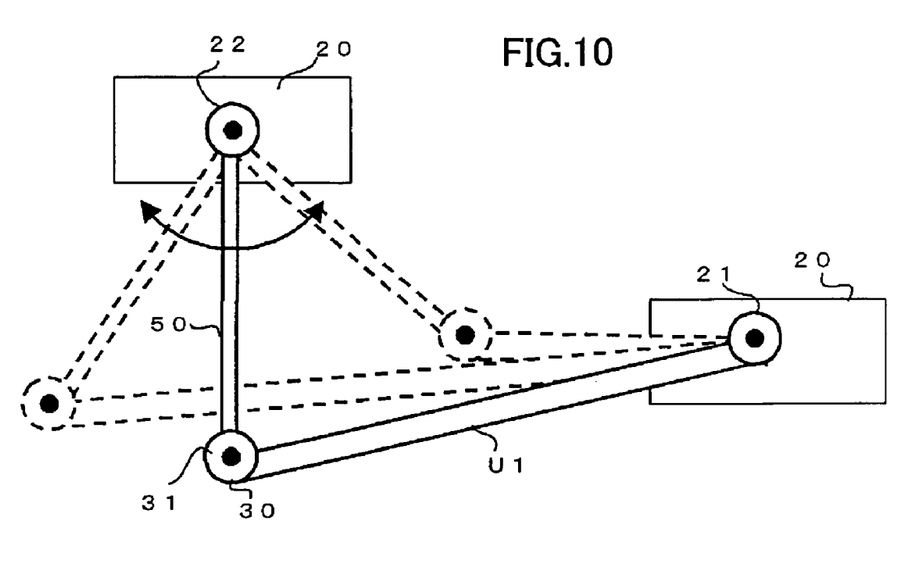
FIG. 10 is a view showing another example of the motion mechanism to which this invention is applicable.

In an example shown in FIG. 10, a drive axis U1, which expandable and contractible by means of a servomotor or the like accommodated therein, is connected at its one end to a fulcrum 22 provided in a stationary member 20, and an arm 50 of a predetermined length is connected at one end thereof to a fulcrum 22 of another stationary member 20 so as to be rotatable around a rotation axis A. The arm 50 and the drive axis U1 have the other ends thereof connected to a fulcrum 31 of a movable member 30. A motion command for the rotation axis A is converted into a motion command for the drive axis U1. In accordance with this motion command, a servomotor for actuating the drive axis U1 is driven so as to control the position and velocity of the movable member 30. This invention is also applicable to the just-mentioned mechanism.

What is claimed is:

1. A controller for controlling a machine having drive axes driven by servomotors in accordance with an operation program prepared as data in a rectangular coordinate system, comprising:

a command analysis section for analyzing commands of the operation program to output data for first interpolation processing;

first interpolation means for performing first interpolation processing on the data outputted from said command analysis section to obtain a first interpolated position on a motion path in the rectangular coordinate system at every first sampling period;

a transformation section for transforming the first interpolated position in the rectangular coordinate system into positions of the drive axes in a coordinate system of the drive axes;

a memory for temporarily storing the transformed positions of the drive axes;

a composite tangential acceleration calculating section for obtaining a composite tangential acceleration in the coordinate system of the drive axes for each of segments between the first interpolated positions based on the transformed positions of the drive axes and maximum allowable acceleration values preset for the drive axes;

a composite velocity limit calculating section for determining a composite velocity limit in the coordinate system of the drive axes at an end point of each of the segments;

a composite deceleration target velocity calculating section for determining a composite deceleration target velocity in the coordinate system of the drive axes at the end point of each of the segments in accordance with the composite tangential acceleration and the composite velocity limit;

acceleration/deceleration control means for performing acceleration/deceleration control for a composite tangential velocity of the drive axes in accordance with the composite deceleration target velocity to obtain a composite tangential motion amount at every second sampling period; and second interpolation means for obtaining a second interpolated position at every second sampling period based on the tangential motion amount determined by said acceleration/deceleration control means and the transformed positions of the drive axes stored in said memory to determine motion commands for the drive axes.

2. A controller according to claim 1, wherein the composite velocity limit is determined as a composite tangential velocity of the drive axes with which at least one of velocity, acceleration and jerk of each of the drive axes does not exceed each associated maximum allowable value preset for each of the drive axes.

3. A controller according to claim 1, wherein said second interpolation means defines a smooth curve on the first interpolated positions, and determines the second interpolated positions on the smooth curve.

4. A controller according to claim 3, wherein the smooth curve is defined according to an n-degree polynomial.

* * * * *

UNITED STATES PATENT AND TRADEMARK OFFICE
CERTIFICATE OF CORRECTION

PATENT NO. : 7,039,494 B2
APPLICATION NO. : 10/909304
DATED : May 2, 2006
INVENTOR(S) : Toshiaki Otsuki et al.

It is certified that error appears in the above-identified patent and that said Letters Patent is hereby corrected as shown below:

Column 5, line 5, change "$u1_n n$" to --$u1_n$--

Column 6, line 25, change "$a^2 n$," to --$a2_n$--

Column 7, line 8, after "composite", delete "."

Column 11, line 10, change "$023\ t \leq Lc$" to --$0 \leq t \leq Lc$--

Column 11, line 52, change "C1D1" to --C1, D1--

Column 11, line 57, after "increment" delete "t" and insert --$\Delta t$--

Column 11, line 58, after "from" delete "s" and insert --$\Delta s$--

Column 11, line 62, after "increment" delete "t" and insert --$\Delta t$--

Signed and Sealed this

Twenty-fourth Day of October, 2006

JON W. DUDAS
*Director of the United States Patent and Trademark Office*